US000002018H

(19) United States

(12) Statutory Invention Registration (10) Reg. No.: US H2018 H

Giaimo et al. (43) Published: Apr. 2, 2002

(54) MULTI-LAYERED POLYMER PREFORM AND CONTAINER VIA SELECTIVE HEAT UP ADDITIVES

(75) Inventors: Laura Renee Giaimo, Hudson; Edwin Andrew Sisson, Akron, both of OH (US)

(73) Assignee: Shell Oil Company, Houston, TX (US)

(21) Appl. No.: 09/286,537

(22) Filed: Apr. 5, 1999

(51) Int. Cl.[7] ..... B29D 22/00; B29D 23/00; B32B 27/06

(52) U.S. Cl. ..... 428/35.7; 428/36.91; 428/542.8; 428/480; 215/12.1; 215/12.2; 215/379

(58) Field of Search ..... 428/36.91, 542.8, 428/35.7, 480; 215/12.1, 12.2, 379

(56) References Cited

U.S. PATENT DOCUMENTS 5,804,305 A * 9/1998 Slat et al. ..... 428/36.7
5,925,710 A * 7/1999 Wu et al. ..... 524/495
6,034,167 A * 3/2000 Tung et al. ..... 524/496

* cited by examiner

*Primary Examiner*—Michael J. Carone
*Assistant Examiner*—M. Thomson
(74) *Attorney, Agent, or Firm*—Renner, Kenner, Greive, Bobak, Taylor & Weber

(57) ABSTRACT

A multilayered polymeric preform or container is disclosed wherein the blow temperatures of each polymer in a preform is controlled by the addition of a predetermined selected amount of a fast heat up additive such that each polymer layer blows at the same relative period of time to prepare the container.

14 Claims, 1 Drawing Sheet

Figure 1:
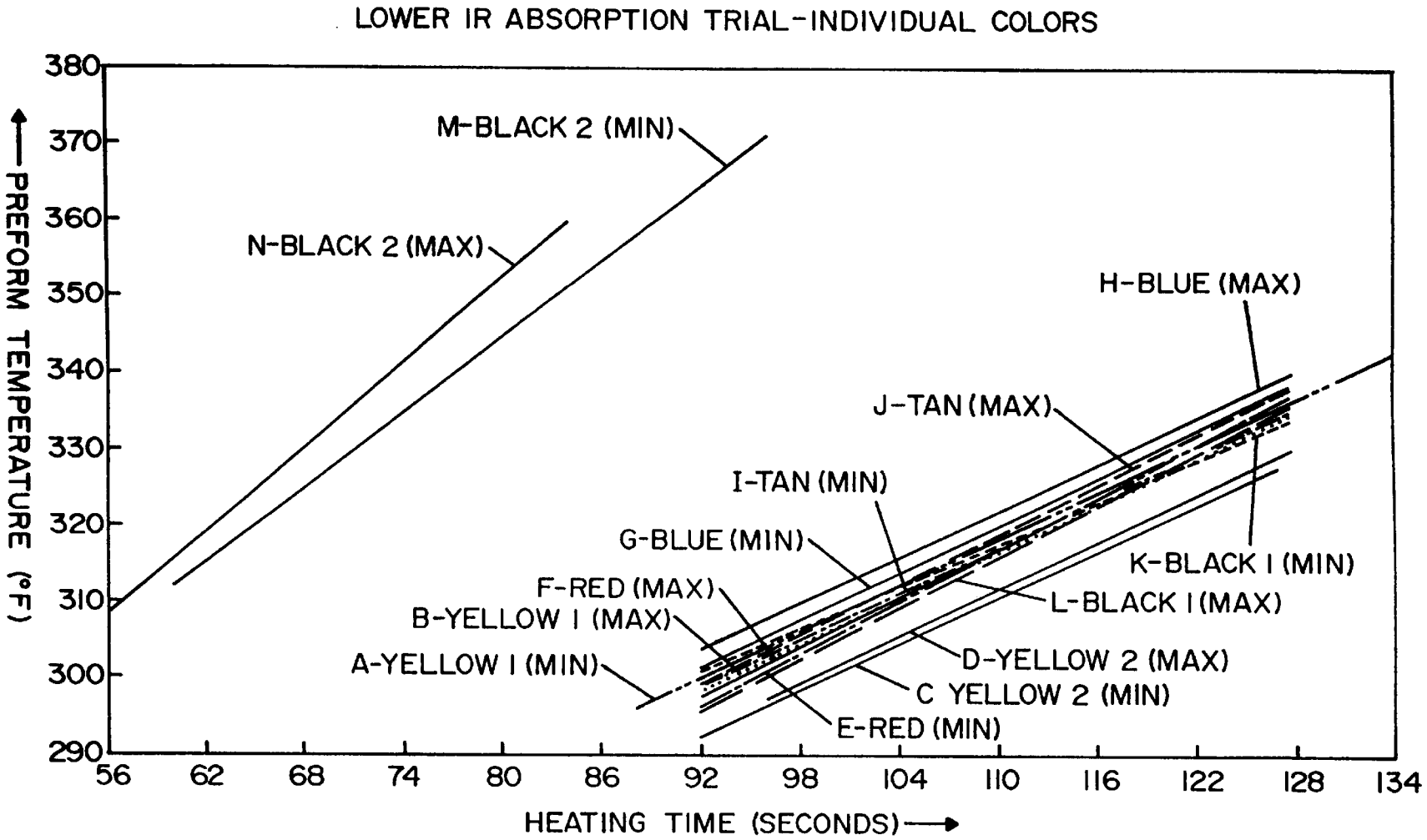

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTI-LAYERED POLYMER PREFORM AND CONTAINER VIA SELECTIVE HEAT UP ADDITIVES

FIELD OF THE INVENTION

This invention relates to a preform and container and a method to make said preform and container by providing at least two polymeric layers with different blowing temperatures, wherein at least one additive is present. The additive(s) exist in quantities sufficient to cause the polymeric layers to heat to their respective blow temperatures in the same or essentially the same period of time.

BACKGROUND OF THE INVENTION

Energy absorbing materials such as carbon black and graphite have been used in polymeric materials to reduce heat up time. Pengilly, U.S. Pat. No. 4,408,004 discloses the use of carbon black in PET in a range from less than 10 parts per million (ppm). The carbon black can be added at any stage of the polyester preparation, such as the esterification or the transesterification reaction or at the condensation stage. The Example of the '004 patent show that the carbon black can be added in controlled quantities such that the polymer heats up faster but still produces a high clarity, low haze polymer.

Laser imageable assemblies comprising transparent material have called for the use of carbon black and/or graphite as energy absorbing material. In U.S. Pat. No. 4,711,834, a disclosure is made to use graphite and carbon black in a binder resin in amounts such that the weight ratio of particles to binder resin is 10:1 to 1:2. The polymeric material discussed includes the terephthalic acid and the 2,6 (NDC is 2,6, but some work does contemplate 2,7) -naphthalene dicarboxylic acid, each combined with ethylene glycol. These energy-absorbing materials are dispersed in the heterogeneous resin layer to absorb energy passing through the layer.

Containers, most specifically bottles, have been developed to hold food and beverages comprised of polymeric materials such as PET and PEN. The art also indicates that both PEN and PET layered bottles can be used to attain the benefits of some of the barrier properties of the PEN with the cost efficiency of the PET. Other disclosures have lined these polymers with substrates such as aluminum or glass to also achieve high barrier, low cost properties.

While these concepts have been disclosed for PEN and PET, no successful bottle has been made from the strain hardenable versions because of the significant difference in blowing temperature of PEN and PET. When one heats that multi-layer structure at the same rate, the PEN is either too cold to blow or the PET is too hot to blow. This problem was described in 1994. (Excerpt from BevPak Americas 1994, Sisson, Callander, "High Performance PEN & Naphthalate Based Packaging Resins", Presented Apr. 11, 1994.)

> ". . . Tg's and melt points have a "linear function".This is important, particularly for those interested in co-injection or multilayer structures. Previous work with PEN homopolymer/PET structures indicates that the melt points and the Tgs of the PEN and PET homopolymers were too far apart for a two step process. In the injection step, the heat required to melt the PEN would crystallize the PET and in the reheat step, the temperature required to reach PENs Tg was too great for the PET."

Some art discloses PEN as an example of an inner layer. However, the PEN described is a highly modified copolymer such that is not strain hardenable. It has no melting point or crystalline type conditions. This limits this art to the properties of an essentially amorphous PEN with substantially less naphthalate. In addition to not maximizing the properties for the amount of PEN, the amorphous materials are costly to dry and process relative to a crystalline material.

The problem addressed in this invention is the fact that multilayers of PEN/PET polymers cannot be reheat blown with traditional formulations. Recognition is made of the difference in the $T_g$ values between PEN and PET. This large difference creates two separate blow windows which do not overlap and has thus made it difficult to make a multilayer PET/PEN bottle using a reheat blow process from a preform.

This invention provides substantial improvements over the art. By changing the heating rate of the PEN (or PET or both) so that it or they reaches its higher blow temperature at the same time the PET reaches its lower blow temperature, one can now incorporate crystallizable and strain hardenable PEN's and their advantages of orientation and processing.

SUMMARY OF INVENTION

This invention describes a multilayer polymeric preform or container wherein the blow temperatures of each polymer layer is controlled by the addition of a faster heat up rate additives such that the polymer layers in the preforms blow at the same relative period of time to make the container.

DETAILED DESCRIPTION OF THE INVENTION

This invention encompasses a multilayered polymeric preform and/or container. The container blown from the preform is preferably a beverage bottle useful for containing liquids such as beer or soft drinks. In the preforms, it is important to have the high barrier properties of PEN combined with the low cost of PET to form an economically viable bottle.

PET can be made from the polycondensation reaction of terephthalic acid or its ester and ethylene glycol or other similar diol. PEN can be made from the reaction of napthalene dicarboxylic acids, or its ester, with ethylene glycol or another type of diol.

It is also considered within the scope of this invention that the PEN and the PET substrates may be copolymers of PEN or PET within the conventional knowledge of the copolymers of these materials. The PET and PEN are preferably a strain hardenable or crystallizable variant.

It is necessary to heat the preforms in order to make the blown bottles for use with the beverage. The preform is heated by infrared lamps which absorb energy over a period of time. It is advantageous if this period of time can be reduced as much as possible to save energy and time.

It has now been discovered that a preform can be produced containing multiple layers of polymers, particularly PET and PEN which can be made to heat up at the same time. This invention provides for the selective and predetermined addition of fast heat up additives so that the PEN and PET layers are preferentially heated to a proper blow temperature at different rates but will reach a final polymeric blow temperature at the same or substantially the same time. This is done by tailoring the individual layers by using the additive or faster heat up component in the PEN layer and if desired, some slower heat up or slower crystallizing component in the PET layer. By doing this, both layers reach their respective blow temperatures in their respective blow window at the same or substantially the same time.

The blowing process is not usually a single temperature, but is described by those skilled in the art as the blow window. The blow window exists over a temperature range. It is different for each polymer. Blowing the preform outside the blow window results in poor container shape, pearlessance and/or white crystallinity; depending upon which side of the blow window the preform is blown.

The fast heat up additive material charged to the respective polymeric layers will comprise either different colorants or other heat up materials, such as carbon black and/or graphite and/or diamond dust. The quantity of colorant and/or various forms of carbon will be present in the PET or the PEN at approximately 5 ppm to about 1000 ppm. It is important to pre-calculate or pre-determine the amount of heat up material additives necessary to add to the layers of the preform whereby the respective PEN and the PET layers will consume the same amount of time to form the blown bottle container from the preform. The thickness of the layers, the composition and clarity of the polymers, and whether or not the layers will be interior or exterior of one another may vary the predetermined amount of fast heat up additive such that no empirical amount can be recited.

It is contemplated within the scope of this invention that the PET may be used on the interior of the bottle with respect to the inside of the bottle or on the outside of the bottle. When the PET is used on the outside of the bottle, the PEN is then used on the inside of the bottle, in contact with the beverage. Likewise when the PEN is used on the outside of the bottle, the PET may be used on the inside of the bottle in contact with the beverage. Also contemplated is an A/B/A structure where A is PEN and B is PET or vice versa. It is also contemplated that multiple layers of other polymers may be used such as polybutylene or IPA modified copolymers of PET. It is important that these layers configure to demonstrate reheat process at the same time.

While the examples here use PEN and PET, the solution is applicable to other systems where the polymer blow temperatures are different.

EXAMPLES

A PEN material sold under the trademark as HiPERTUF™ 90000 was produced using a Nissei 52 injection unit. Different colorants were also provided and added to the PEN. The colorants are typically found in colorants supplied by Color Matrix. There were two yellows, a red, blue, tan and two blacks that were evaluated for heat up rates. Each of the seven colors was evaluated at 2 (LDR) for a total of 14 hours. The preforms were injected using standard Nissei 16-ounce molds. The following formula was used to calculate the pump setting over each run:

$$Ps = \frac{\text{Shot size} \times \text{\# cavities} \times \text{LDR} \times \text{Constant}}{d_1}$$

where $Ps$ = Pump setting

Shot size = 28.7 g # cavities = 1

$LDR$ = Let Down Ratio = 0.05 minimum and 0.10 maximum for all colors except tan and black 1 $LDR$ for Tan was 0.036 (min) and 0.055 (max)

Constant = 1.35×6.6 (based on pump)

$d_1$ = Density of liquid colorant where the individual colors were evaluated and shown in Table 1.

TABLE 1

| Color | LDR (min) | LDR (max) | Pump Setting (min) | Pump Setting (max) | Density Colorant (lb/gal) |
|---|---|---|---|---|---|
| Yellow 1 | 0.05 | 0.10 | 1.5 | 3.0 | 8.52 |
| Yellow 2 | 0.05 | 0.10 | 1.6 | 3.2 | 8.03 |
| Red | 0.05 | 0.10 | 1.3 | 2.6 | 9.75 |
| Blue | 0.05 | 0.10 | 1.5 | 3.0 | 8.10 |
| Tan | 0.036 | 0.055 | 1.0 | 1.5 | 9.28 |
| Black 1 | 0.034 | 0.049 | 1.0 | 1.5 | 8.73 |
| Black 2 | 0.05 | 0.10 | 1.6 | 3.2 | 7.84 |

Heat up rates of the colors were determined by reheating the preforms on the RHBO-L equipment using IR cameras and Prism DS by FSI to measure the temperature of the preforms just prior to the mold close. Preform temperatures were determined across the entire blow window for each color's pearlesscence. FIG. 1 shows the heat up rates for each additive. This showing indicates that the black colors heat up on an order of 1.5 times faster than the other colors. This color is usually present where carbon black has been used.

From this showing, the heat up rates of a PEN/PET multilayered container may be tailored so that the slower heating components in a slow crystallizing PET formulation would finish their reheat process at the same time as the PEN layer having the same or different additive materials in the same or different quantity. By doing this, both layers reach their respective blow temperatures in essentially the same amount of time.

EXAMPLE 2

A demonstration of this technique was accomplished by creating a preform having a 1 mm inner layer of PEN with a faster heating amber colorant. The outer layer was a PET copolymer of 3 mm thickness. The preforms were successfully blown into bottles without pearlessance.

What is claimed as our invention is:

1. A preform comprised of multiple polymer layers, each polymer layer having a blow window for blowing a container, wherein at least one polymeric layer has an amount of fast heat up additive effective for essentially equalizing heating times required for the individual polymeric layers to reach their respective blow windows.

2. The preform of claim 1 wherein one polymeric layer comprises polyethylene naphthalate (PEN) and a second layer comprises polyethylene terephthalate (PET).

3. The preform of claim 1 wherein the fast heat up additive comprises a compound selected from the group consisting of carbon black, graphite, diamond dust and combinations thereof.

4. The preform of claim 1 wherein the fast heat up additive comprises a colorant composition.

5. The preform of claim 2 wherein the PEN is external and the PET is internal with respect to an interior of the preform.

6. The preform of claim 2 wherein the PET is external and the PEN is internal with respect to an interior of the preform.

7. The preform of claim 1 wherein the preform is a beverage bottle preform.

8. A bottle made from the preform of claim 7 wherein the bottle has polymeric layers which act as barriers for said beverage.

9. A method of making a bottle preform having multiple polymeric layers, the method comprising:

a) forming a first layer of polymeric material as one layer of the preform; and b) forming a second layer of polymeric material, juxtaposed to said first layer of polymeric material, wherein a predetermined amount of at least one fast heat up additive has been added to at least one polymeric layer in quantities sufficient to cause the first and second polymeric layers to heat to their respective blow temperatures in the same or essentially the same period of time; and c) heating said bottle preform to blow temperatures.

10. The process of claim 9 wherein the first layer of polymeric material is selected from the group consisting of PET and PEN and wherein, when the first layer is chosen to be PET, the second layer is chosen to be PEN and when the first layer is chosen to be PEN the second layer is chosen to be PET.

11. The process of claim 10 wherein the respective PET or PEN chosen as the first and second layer is a strain hardenable crystallizable variant of the PEN or PET or both.

12. The process of claim 9 wherein the fast heat up additive comprises a compound selected from the group consisting of carbon black, graphite, diamond dust, colorant compositions and combinations thereof.

13. The process of claim 12 wherein the fast heat up additive is present in a quantity of 5 ppm to 1000 ppm.

14. The process of claim 9 wherein the preform comprises a beverage bottle container wherein said respective blow temperatures are reached at the same or essentially the same period of time.

* * * * *